Aug. 6, 1957  H. E. WEISS  2,802,197
VEHICLE SPEED CONTROLLED HORN SYSTEM
Filed Aug. 31, 1955

INVENTOR.
Howard E. Weiss
BY
Harness and Harris
ATTORNEYS

United States Patent Office 2,802,197
Patented Aug. 6, 1957

2,802,197

VEHICLE SPEED CONTROLLED HORN SYSTEM

Howard E. Weiss, Oak Park, Mich., assignor to Chrysler Corporation, Highland Park, Mich., a corporation of Delaware Application August 31, 1955, Serial No. 531,735

4 Claims. (Cl. 340—62)

This invention relates to a system of controlling automobile horns and more particularly to systems including a low volume horn for city driving and a high volume horn for country or high speed driving.

It is the object of the present invention to provide a system of control in which the pressing of the horn button causes a low volume horn to sound in normal city driving but which will cause a high volume horn to sound if the horn button is pressed at a time when the vehicle speed exceeds a predetermined limit that might be that normally prescribed for city driving, for example, a speed in excess of 35 M. P. H.

It is another object of this invention to provide a vehicle speed responsive sound intensity control for the vehicle horn system that is directly responsive to the speed of a driven element of the vehicle drive train rather than to the speed of some driving element of the vehicle engine, the wind velocity, or the like.

It is still another object of this invention to provide a variable intensity horn system that is vehicle speed sensitive and wherein the system is composed of a simple, inexpensive, readily installed, addition to the conventional, electrically operated, vehicle horn system.

It is a further object of this invention to provide a variable intensity, vehicle speed sensitive, horn system that is particularly adapted for installation in vehicles having power transmission units that utilize a vehicle speed responsive control as a component of their transmission control means.

It is still another object of this invention to provide a variable intensity horn control system for vehicles that is responsive to vehicle speed and one that is particularly adapted for installation in a vehicle having a readily available source of vehicle speed responsive pressure fluid.

It is still another object of this invention to provide a simplified, foolproof, horn system that automatically determines the horn sound intensity to be emitted on depression of the horn control button, said horn sound intensity being louder when the vehicle is traveling in certain vehicle speed ranges than in other vehicle speed ranges.

Figure 1:
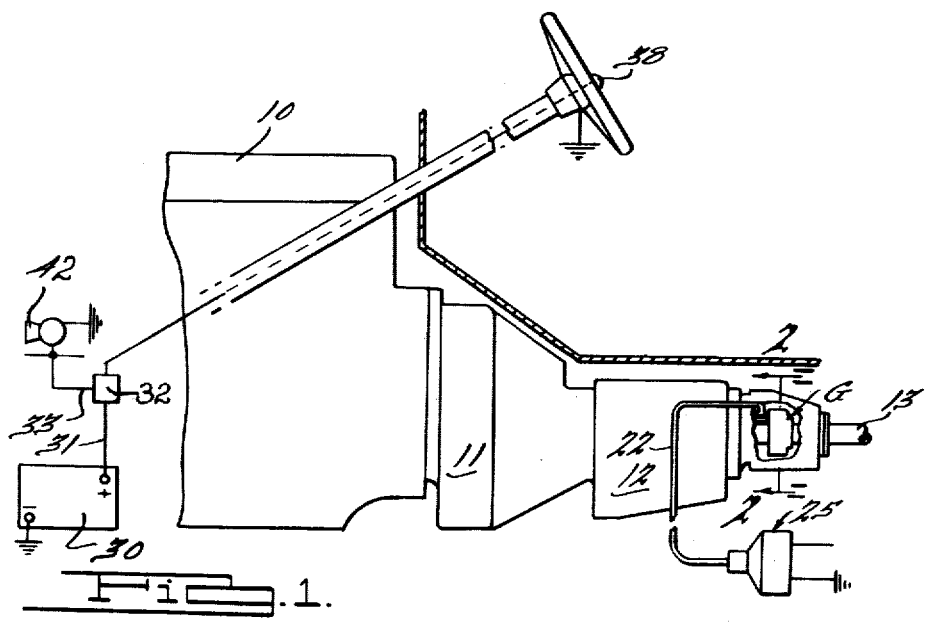
Figure 2:
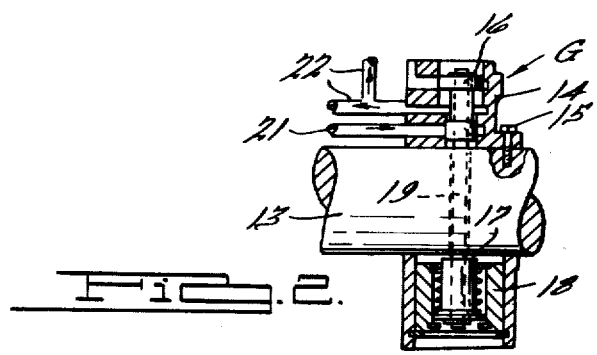
Figure 3:
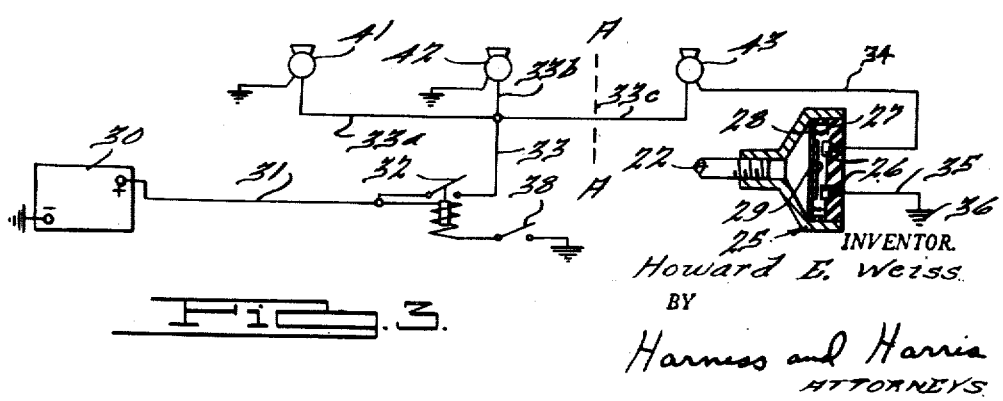

Other objects and advantages of this invention will become readily apparent from a reading of the following description and a consideration of the related drawings wherein:

Fig. 1 is a fragmentary sectional elevational view of a motor vehicle power train that has this invention applied thereto;

Fig. 2 is an enlarged, fragmentary, sectional elevational view taken along the line 2—2 of Fig. 1 showing a hydraulic vehicle speed responsive governor that is mounted on the drive shaft of the vehicle drive train of Fig. 1; and Fig. 3 is a diagrammatic sketch showing the wiring diagram and associated elements of a horn control system embodying this invention associated with the vehicle structure shown in Figs. 1 and 2.

It is old in the art to provide a horn control system for vehicles that is adapted to provide a low intensity or mild horn for low speed city use and a high intensity or powerful horn for high speed country use. It is also known that various means have been associated with horn systems to try to relate the horn intensity to the vehicle speed. United States Patents 2,283,659 and 2,303,315 are examples of the previous attempts to overcome an existing problem in this field. So far as is known, the prior work in this field has not provided a horn intensity control that is directly responsive to vehicle speed irrespective of engine speed, wind velocity and the like, so as to automatically control the volume or intensity of the horn blast in predetermined vehicle speed ranges. Engine speed is not directly responsive to vehicle speed because of the variations in speed ratio drive obtainable with multi-speed power transmission gear boxes. Furthermore, when the engine is coupled to a fluid coupling or torque converter the slip in the drive train permits high engine speeds to be obtained without achieving commensurate vehicle speeds and thus it is not possible to accurately control horn intensity by the engine speed. Horns controlled by engine speed, wind velocity or similar controls will not restrict the use of the high intensity or loud horn to country or high speed use and thus they can prove to be quite objectionable and erratic in operation. The invention herein disclosed provides a variable intensity horn control system that overcomes the aforementioned disadvantages and insures the proper intensity horn at all times.

Fig. 1 shows a portion of a motor vehicle wherein 10 represents an engine that is drivingly connected through a clutch, fluid coupling or torque converter 11 to a multi-speed transmission gear box 12. Drive from the gear box 12 is transmitted by means of a drive shaft or propeller shaft 13 to the driving wheels (not shown) of the vehicle. Mounted on the drive shaft 13 is a hydraulic governor G which is shown in detail in Fig. 2.

Governor G has a valve body 14 that is drivingly connected to the drive shaft 13 by bolt or similar means 15. This governor mechanism G includes a radially movable valve 16 that is connected to a diametrically opposed pair of interconnected, radially movable, weights 17 and 18 by means of a tie rod 19. Pressure fluid from a suitable constant pressure source, such as an engine driven pump (not shown), is supplied to the valve bore of the valve body 14 by means of the supply conduit 21. A pressure fluid, whose intensity varies with and is directly proportional to the speed of the drive shaft 13 will be discharged from the valve body 14 by way of discharge conduit 22 whenever the drive shaft 13 is rotated. This variable, speed responsive, pressure fluid discharged by the governor discharge conduit 22 is denoted "governor" pressure in that it is a speed responsive fluid that can be used to provide an accurate speed responsive control means. A detailed description and disclosure of the governor G is contained in U. S. Patent 2,697,363. This governor G does not form a specific part of this invention so additional detailed explanation thereof is not thought to be required.

From Fig. 1 it will be noted that the speed responsive pressure fluid passed into the discharge conduit 22 of governor G is conducted to a pressure sensitive electric switch 25. From Fig. 3, it will be noted that the pressure of the fluid supplied to conduit 22 will act on the switch diaphragm 28 and cause the switch 25 to have its contacts 26, 29 closed when the pressure fluid in conduit 22 is of sufficient intensity to overcome the resisting force of the spring 27. The diaphragm 28 of switch 25 carries the switch conductor element 29 that connects the switch contacts 26 when the pressure of the fluid in conduit 22 is of a predetermined value. As the pressure of the fluid in conduit 22 is directly responsive to the speed of drive shaft 13 and thus the vehicle speed, the switch 25 constitutes a vehicle speed responsive control switch for a portion of the electrical circuit shown schematically in Fig. 3.

The electrical circuit shown in Fig. 3 includes a source of electrical energy 30, such as a grounded battery, which is connected by conductor means 31 to the parallelly arranged relay operated switch contact 32 and the conventional grounded horn button switch 38. On closing of the horn button switch 38 the relay of switch 32 is energized and switch 32 is closed so as to connect the battery 30 through the connected conductors 31, 32 to conductors 33, 33a and 33b and to the parallelly connected horns 41 and 42. As each of horns 41 and 42 is grounded, it is thought to be obvious that these horns will each be sounded whenever the horn button switch 38 is closed. The horns 41 and 42 are the conventional pair of horns usually provided on vehicles, that may be denoted "city" horns for the purpose of this description.

Connected to the conductor 33, by the branch conductor 33c, and arranged in parallel with the "city" horns 41 and 42, is a so-called "country" horn 43. Horn 43 is connected by a conductor 34 to one contact 26 of the governor switch 25. The other contact 26 of the governor switch 25 is connected by a conductor 35 to ground at 36. From a consideration of Fig. 3, it is thought to be obvious that whenever the speed of drive shaft 13 is sufficiently fast to produce a governor pressure in conduit 22 that will close the contacts 26, 29 of switch 25, then any closing of the horn button switch 38 under these conditions will cause a simultaneous sounding of the "city" horns 41, 42 and the "country" horn 43. If the speed of drive shaft 13, that is the vehicle speed, is not sufficiently fast to produce a closing of the governor switch 25, then any closing of the horn button switch 38 will merely cause a sounding of the "city" horns 41 and 42. By the choosing of a suitable strength spring 27 for the governor switch 25, it is possible to accurately establish at what vehicle speed the sound of the "country" horn 43 may be added to the sound of the "city" horns 41 and 42 to produce the increased sound intensity desired for high speed, country use, safety warnings.

A consideration of Fig. 3 will also make it clear that the portion of the electrical circuit to the left of the line A—A in this figure is the conventional dual horn system usually provided on present day motor vehicle. The portion of the electrical system to the right of the line A—A is all that is required to be added to the conventional horn system in order to convert it to a vehicle speed responsive, "city" and "country," variable intensity, horn system. The elements to the right of the line A—A in Fig. 3 comprise merely a third horn, a pressure fluid operated switch, such as a conventional stop-light switch, and suitable lengths of fluid conduit and electrical conductor wiring. In most present day automatic power transmissions a source of vehicle speed responsive pressure fluid is readily available so it is an easy matter to connect the governor switch 25 to this source of vehicle speed responsive pressure fluid. The other connections required to add the "country" horn to a conventional "city" horn system are so simple and obvious from Fig. 3 that no additional explanation is deemed necessary.

While the drawings show a particular application of this invention to a hydraulically operated power transmission unit, still, any other type of governor switch, responsive to vehicle speed, could be substituted for the switch 25. In certain present day transmission overdrive arrangements a governor switch is already provided and this same governor switch could be utilized to control energization of the "country" horn as taught by this disclosure. Electrical governors rather than hydraulic governors, that are directly responsive to vehicle speed, obviously could be used as taught by this disclosure.

I claim:

1. In combination with a vehicle power transmission unit having an output shaft and a source of pressurized fluid the pressure of which is directly responsive to the speed of said output shaft, a horn control system comprising an electrical energy source, a first electrically operated horn connected by a first conductor means to said energy source, said first conductor means including a first switch means to control energization of said first horn, a second electrically operated horn connected by a second conductor means to said first conductor means and arranged to have the energization thereof controlled in part by said first switch, said second conductor means including a second switch operably responsive to the pressure of a predetermined output shaft speed responsive pressure fluid to in part control the energization of said second horn.

2. In combination with a vehicle power transmission unit having an output shaft and a source of pressurized transmission control fluid the pressure of which is directly responsive to the speed of said output shaft, a horn control system comprising an electrical energy source, a first electrically operated horn connected by a first conductor means to said energy source, said first conductor means including a first switch means to control energization of said first horn, a second electrically operated horn connected by a second conductor means to said first conductor means and arranged in parallel with said first horn so as to have the energization thereof controlled in part by said first switch, said second conductor means including a second switch arranged in series with said first switch and operably responsive to a predetermined pressure of the output shaft speed responsive pressure fluid to in part control the energization of said second horn.

3. In combination with a vehicle power transmission unit having an output shaft and a source of pressurized fluid the pressure of which is directly responsive to the speed of said output shaft, a horn control system comprising an electrical energy source, a first electrically operated horn connected by a first conductor means to said energy source, said first conductor means including a first, manually operable, switch means arranged in series with said source and said first horn to control energization of said first horn, a second electrically operated horn connected by a second conductor means to said first conductor means and arranged in parallel with said first horn so as to have the energization thereof controlled in part by said first switch, said second conductor means including a second switch arranged in series with said first switch and said second horn and operable by a predetermined pressure of the output shaft speed responsive pressure fluid to in part control the energization of said second horn.

4. In combination with a motor vehicle pressure fluid controlled power transmission unit having an output shaft and a fluid pressure governor mechanism providing pressurized directly responsive to the speed of said output shaft, a horn control system comprising a source of electrical energy, a first electrically operated horn connected by a first conductor means to said energy source, said first conductor means including a first normally open, manually controlled, relay operated switch connected in series relationship with said first horn, and a second electrically operated horn connected in parallel with said first horn by a second conductor means, said second conductor means including a second switch arranged in series relationship with said second horn and automatically operated by the pressurized fluid of said governor device within a predetermined vehicle speed range.

References Cited in the file of this patent

UNITED STATES PATENTS

| | | |
|---|---|---|
| 2,283,659 | White | May 19, 1942 |
| 2,303,315 | Bales | Dec. 1, 1942 |
| 2,336,762 | White | Dec. 14, 1943 |
| 2,337,788 | White | Dec. 28, 1943 |
| 2,681,957 | Schneider | June 22, 1954 |
| 2,685,048 | Schweitzer | July 27, 1954 |

UNITED STATES PATENT OFFICE

CERTIFICATE OF CORRECTION

Patent No. 2,802,197 August 6, 1957

Howard E. Weiss

It is hereby certified that error appears in the printed specification of the above numbered patent requiring correction and that the said Letters Patent should read as corrected below.

Column 3, line 42, for "vehicle" read -- vehicles --; column 4, line 8, strike out "the" and insert instead -- a predetermined --; line 9, strike out "a predetermined" and insert instead -- the --; column 4, line 52, after "pressurized" insert -- fluid --.

Signed and sealed this 8th day of October 1957.

(SEAL)
Attest:
KARL H. AXLINE

Attesting Officer

ROBERT C. WATSON
Commissioner of Patents